United States Patent [19]

Dieckmann et al.

[11] Patent Number: 5,240,495
[45] Date of Patent: Aug. 31, 1993

[54] IN SITU FORMATION OF METAL-CERAMIC OXIDE MICROSTRUCTURES

[75] Inventors: Rüdiger Dieckmann; Stephen L. Sass, both of Ithaca, N.Y.

[73] Assignee: Cornell Research Foundation, Inc., Ithaca, N.Y.

[21] Appl. No.: 862,068

[22] Filed: Apr. 2, 1992

[51] Int. Cl.$^5$ .............................................. C22B 5/12
[52] U.S. Cl. ........................................ 75/392; 75/433; 75/613; 75/622; 75/623; 75/625; 75/627; 75/629; 75/638; 75/656; 419/45; 427/217; 428/614
[58] Field of Search ................ 75/392, 433, 613, 622, 75/623, 625, 627, 629, 638, 656; 419/19, 22, 45, 56; 427/217; 428/614

[56] References Cited

U.S. PATENT DOCUMENTS

| | | | |
|---|---|---|---|
| 3,024,110 | 3/1962 | Funkhouser et al. | 419/19 |
| 3,044,867 | 7/1962 | Edstrom | 419/19 |
| 3,369,877 | 2/1968 | Humenik | 75/235 |
| 4,397,963 | 8/1983 | Morgan | 75/235 |
| 4,605,440 | 8/1986 | Halverson et al. | 75/238 |
| 4,770,701 | 9/1988 | Henderson et al. | 75/232 |
| 4,770,701 | 9/1988 | Henderson | 75/232 |
| 4,797,378 | 1/1989 | Sowman | 501/95 |
| 4,800,065 | 1/1989 | Christodoulou et al. | 420/129 |
| 4,818,734 | 4/1989 | Kanter et al. | 501/128 |
| 4,961,902 | 10/1990 | Clere et al. | 419/12 |
| 4,981,632 | 1/1991 | Claar et al. | 264/60 |
| 5,017,217 | 5/1991 | Clere et al. | 75/244 |
| 5,017,533 | 5/1991 | Newkirk et al. | 501/127 |
| 5,024,794 | 6/1991 | Newkirk et al. | 264/57 |
| 5,066,618 | 11/1991 | Kantner et al. | 501/127 |

OTHER PUBLICATIONS

Tuan, W. H., et al, Journal of the European Ceramic Society 6, 31–37 (1990).
Handwerker, C. A., et al., Metal & Ceramic Matrix Composites: Processing, Modelling and Mechanical Behavior, Ed.: Bhagat, R. B., et al., The Minerals, Metals and Materials Society (1990), pp. 457–465.
Franke, P., et al., J. Phys. Chem. Solids, 51(1), 49–57 (1990).

Primary Examiner—Terry J. Owens

[57] ABSTRACT

In situ formation of metal-ceramic oxide microstructures is carried out on a starting oxide phase containing at least a most noble metallic component (e.g., iron) and a least noble metallic component (e.g. manganese) and subjecting the starting oxide phase to a temperature and oxygen partial pressure and for a time period to cause reduction of only part of the most noble metallic component to elemental metal.

11 Claims, 4 Drawing Sheets

IN SITU FORMATION OF METAL-CERAMIC OXIDE MICROSTRUCTURES

This invention was made at least in part with Government support under Office of Naval Research grant number N 00014-91-J-1660. The Government has certain rights in the invention.

TECHNICAL FIELD

This invention is directed to use of reduction reactions to produce metal-ceramic oxide microstructures in situ.

BACKGROUND OF THE INVENTION

Ceramics are important candidates for applications where high temperatures and high stresses are present, because of their good resistance to oxidation and their desirable elastic properties. However, they are also brittle and, therefore, can be used in high stress and high temperature applications only as part of a multi-phase microstructure, frequently in the form of a metal-matrix ceramic composite. While such microstructures can, in principle, be produced with current technology by combining previously prepared fibers and metal powders, the cost per pound is high and, if they are to be used broadly, there is a pressing need for new processes to fabricate such materials economically.

Processes are known where metal-ceramic oxide structures are formed in situ. Funkhauser et al. U.S. Pat. No. 3,024,110 and Edstrom U.S. Pat. No. 3,044,867 disclose processes where a solid solution of oxide compounds or an oxide compound, containing a more noble metallic component in substantial amount more than a less noble metallic component, is subjected to reducing conditions to convert the more noble metallic component entirely to elemental metal to form a mass of metal containing therein particles of ceramic oxide. Humenik, Jr., et al. U.S. Pat. No. 3,369,877 discloses a process where an aluminum component is present in substantial amount more than a molybdenum or a tungsten component and the molybdenum or tungsten component is entirely converted to elemental metal and the product is a mass of aluminum oxide ceramic containing fine elemental metal molybdenum or tungsten particles therein. These processes lack flexibility because the resulting microstructure depends entirely on the ratio of metallic elements in the starting material.

SUMMARY OF THE INVENTION

It is an object of this invention to overcome the disadvantage of lack of flexibility of the aforedescribed process by providing a process where only a part of the most noble metallic component is reduced and the microstructure obtained is related not only to starting material composition but, also to other parameters.

The method of the invention herein is for the in situ formation of metal-ceramic oxide microstructures from a starting oxide phase composition and comprises the step of subjecting particles or a shape made up of either an oxide solid solution or an oxide compound, containing a most noble metallic component and a least noble metallic component, to a temperature and oxygen partial pressure and for a time period selected to cause reduction of only part of the most noble metallic component to elemental metal, the most noble metallic component being reducible to elemental metal at an oxygen partial pressure ranging from $10^{-30}$ atmospheres to 1 atmosphere at said selected temperature, the least noble metallic component being reducible from its lowest oxide to elemental metal at said selected temperature at an oxygen partial pressure at least three orders of magnitude less than the oxygen partial pressure where the most noble metallic component is reducible from its lowest oxide to elemental metal, the temperature being selected from a range of that exceeding 0.4 of the melting temperature in degrees Celsius of the lowest melting phase involved to that which is less than the melting temperatures of any of the oxide phases involved, the oxygen partial pressure being selected from the range of the equilibrium partial pressure at which the least noble metallic component of the initial oxide coexists with its lowest oxide to the equilibrium partial pressure at which the most noble metallic component of the initial oxide coexists with its lowest oxide, the time period being selected from the range of 3 seconds to about 24 hours.

The term "most noble metallic component" is used herein to mean the metal atom component in the starting solid solution or oxide compound which is most easily reducible.

The term "least noble metallic component" is used herein to mean the metal atom component in the starting solid solution or oxide compound which is most difficult to reduce.

The terms "starting oxide phase" and "initial oxide" are used herein to mean oxide in the starting material solid solution or of the starting material oxide compound.

The term "its lowest oxide" is used to mean the oxide of the referenced metallic component where the metallic component is in its lowest valence state.

The term "lowest melting phase involved" is used herein to mean the metallic phase or ceramic oxide phase occurring during the processing, which has the lowest melting temperature.

The term "melting temperature of any of the oxide phases involved" is used herein to mean the individual melting temperature of oxide phases occurring during the processing.

DETAILED DESCRIPTION OF THE INVENTION

Figure 1:
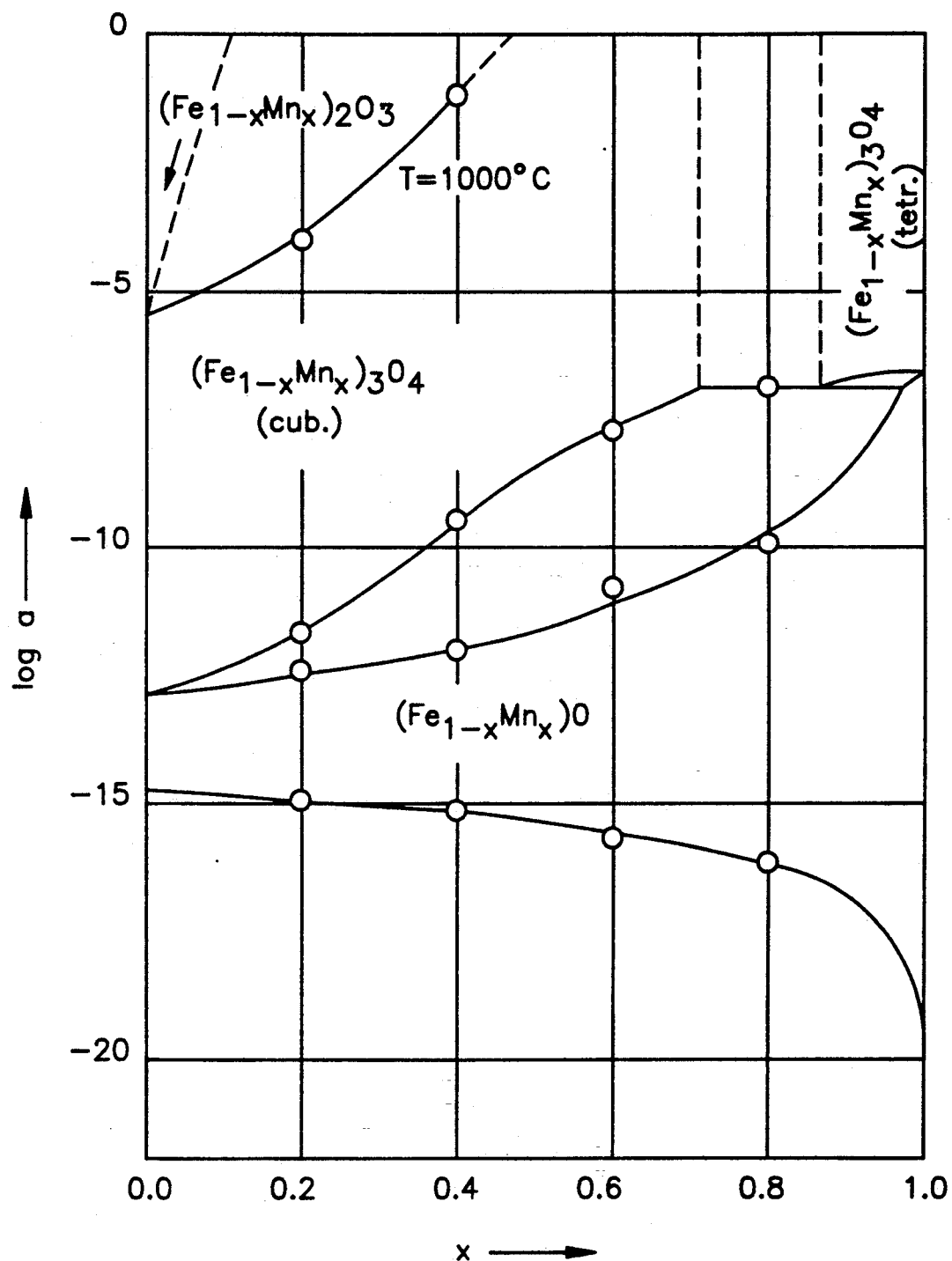
FIG. 1 is a phase diagram for the system Fe-Mn-O at 1000° C. and 1 atmosphere hydrostatic pressure where the y-axis is the log of oxygen partial pressure and the x-axis is Fe/(Fe+Mn) atomic fraction.

The most noble metallic component can be, for example, selected from the group consisting of titanium, vanadium, chromium, manganese, iron, cobalt, nickel, copper and zinc.

The least noble metallic component can be, for example, magnesium, calcium, scandium, yttrium, any of the lanthanides, titanium, zirconium, chromium, manganese, aluminum, silicon, gallium, germanium, or beryllium but as previously indicated must be reducible from its lowest oxide to elemental metal at the selected temperature at an oxygen partial pressure at least three orders of magnitude less than the oxygen partial pressure where the most noble metallic component is reducible from its lowest oxide to elemental metal.

Titanium, chromium and manganese are listed as exemplary of both most noble metallic component and least noble metallic component because they can be used in combination with other components as reducible or non-reducible system components.

Suitable solid solution starting materials include, for example, $(Fe_xMn_{1-x})O$, $(Fe_xCr_{1-x})_2O_3$ and $(Ni_xMn_{1-x})O$ where x is the atomic fraction of the most noble metallic component. The solid solution starting material can contain for example an atomic ratio of most noble metallic component to least noble metallic component ranging from 20:1 to 1:20 preferably from 5:1 to 1:5. The solid solution starting material is easily made from oxides of the metallic components by methods well known to those skilled in the art, e.g., by reacting at temperature and partial pressure conditions determined by the appropriate phase diagram. Preparation of solid solutions is described in Edstrom U.S. Pat. No. 3,044,867 as well as in working examples hereinafter.

Suitable oxide compound starting materials can be, for example, those having the general formula:

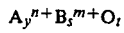
$$A_r^{n+}B_s^{m+}O_t$$

where A and B are respectively the most noble metallic component and the least noble metallic component and when $sm+rn=2t$. These include compounds having the formula $AB_2O_4$ where the most noble metallic component A is selected from metals of Groups IIA, IIB, VIIB and VIII of the periodic table and the least noble metallic component B is selected from metals of Groups IIIA, IIIB and VIB of the periodic table. Suitable components $AB_2O_4$ include, for example, $NiAl_2O_4$, $NiCr_2O_4$, $FeAl_2O_4$, $FeCr_2O_4$, $CoAl_2O_4$, $CoCr_2O_4$, and $MnAl_2O_4$ where r, n, s, m and t in the general formula are respectively 1, 2, 2, 3 and 4. Compounds of the general formula also include those having the formula $A_2BO_4$ where the most noble metallic element A is selected from the metals of Groups IIA, IIB, VIIB and VIII of the periodic table and the least noble metallic component B is selected from metals of Groups IVA and IVB of the periodic table. Suitable compounds $A_2BO_4$ include, for example, $Ni_2TiO_4$ and $Ni_2ZrO_4$ wherein r, n, s, m and t in the general formula are respective 2, 2, 1, 4 and 4. These oxide compounds are available commercially or are made by methods known or available to those skilled in the art.

As previously indicated, the starting material is subjected to reducing conditions either as a shaped form or in particulate form. The shaped form is readily produced by compacting ground starting material, e.g., by hot pressing and is easily treated by the process of the invention herein in an annealing furnace. When particulate starting material is treated by the process herein, it can be subjected to processing by the method herein while suspended in a flowing gas mixture in a fluidized bed furnace and then can be compacted and sintered to form the desired shape of a metal-ceramic oxide object.

While the treatment temperature depends on the starting material, typically the treatment temperature is somewhere in the range of 500° C. to 1200° C.

Turning now to the oxygen partial pressure utilized, this is readily selected by referring to the appropriate phase diagram. While an appropriate oxygen partial pressure depends on the starting material, typically the oxygen partial pressure is somewhere in the range of $10^{-5}$ atmospheres to $10^{-25}$ atmospheres. The appropriate oxygen partial pressure is readily obtained by utilizing a gaseous reducing atmosphere of, for example, the appropriate amounts of CO and $O_2$ containing $N_2$, or $CO/CO_2$, or $CO/H_2O$, or $H_2/H_2O$, or $H_2/CO_2$, which may be diluted using pure $N_2$ or argon. Very suitable gaseous atmospheres are provided by, for example, 2 to 10 volume percent CO in $N_2$ (containing, for example, about 0.0001 volume % $O_2$) or $CO/CO_2$ in a volume ratio $10^{-3}$ to $10^3$. The oxygen partial pressure is readily determined by techniques known in the art, e.g., by measuring with a zirconia cell, or by measurement of the dew point (in the case where the environment is $H_2/H_2O$), or by thermodynamic calculations based on the initial gas composition.

The time period of treatment of shapes preferably ranges from about 1 to 10 hours since shorter periods require higher temperatures and longer periods hold up production. Shorter time periods are appropriate where particles are treated. Variation in the time period is important as far as the percentage of most noble metallic component reduced to elemental metal and so far as the amount of elemental metal in the product. Shorter time periods give less elemental metal in the product.

The percentage of most noble metallic component reduced typically ranges from 5% to 95%, often from 10% to 30%.

The percentage of ceramic phase in the product preferably is greater than 50% by weight, and more preferably is more than 75% by weight.

Figure 2:
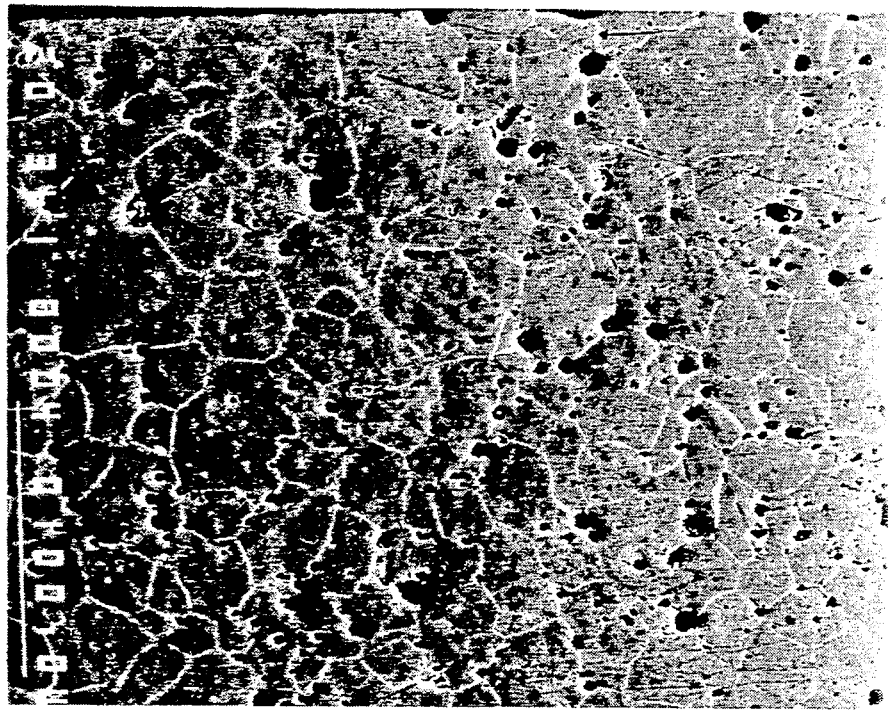
FIG. 2 depicts the microstructure obtained in Example I at 360× magnification.
Figure 3:
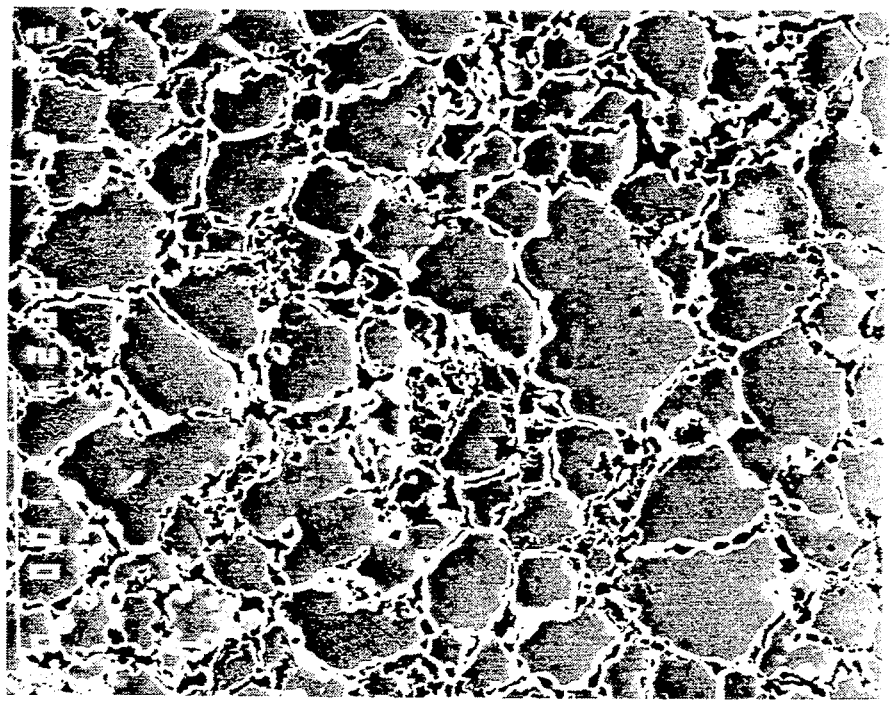
FIG. 3 depicts the microstructure obtained in Example II at 360× magnification.

One kind of product that can be obtained consists of ceramic grains coated with a very thin (e.g., 0.1 micron) up to thicker (e.g. 20.0 micron) metallic coating. These ceramic containing composites are useful in high stress, high temperature applications and are less brittle than the ceramic alone. This kind of microstructure is depicted in FIGS. 2 and 3 herein. One product of this type consists of ceramic grains with a 100 to 800 nm metallic layer in the grain boundaries. Another product of this type is a metal matrix-ceramic oxide particulate composite containing ceramic particles separated by metallic phase of average thickness ranging from about 2 $\mu m$ to about 6 $\mu m$.

Figure 4:
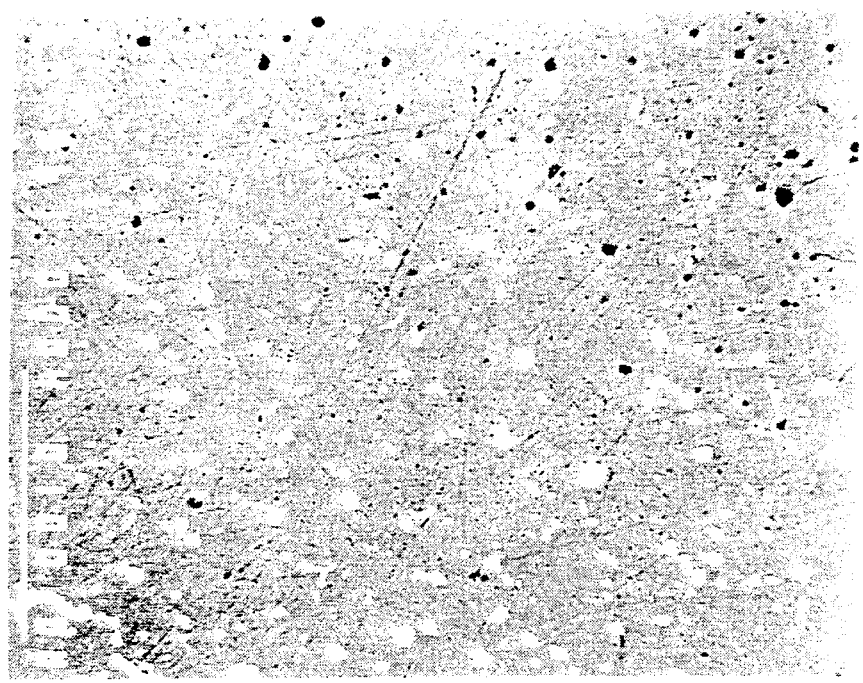
FIG. 4 depicts the microstructure obtained in Example III at 360× magnification.

Another kind of product that can be obtained by the process herein consists of ceramic grains containing a distribution of fine metal particles. These are useful as ductile phase toughened ceramics and are less brittle than the ceramic alone. This kind of microstructure is depicted in FIG. 4 herein.

For an Fe-Mn-O system, processing conditions can be, for example, a $Fe/(Fe+Mn)$ fraction ranging from 0.4 to 0.8, a temperature ranging from 700°-1000° C., an oxygen partial pressure ranging from that corresponding to the lower stability of the (Fe,Mn)O solid solution to values about 5 orders of magnitude below this, preferably ranging from $10^{-20}$ to $10^{-25}$ atmospheres, and a time period ranging from 1 to 10 hours to obtain composite on treating a shape and for 1 to 10 hours to obtain ductile phase toughened ceramic on treating a shape. The conditions are readily selected by reference to a suitable Fe-Mn-O system phase diagram containing oxygen partial pressure information. A phase diagram for Fe-Mn-O is set forth in "Thermodynamics of Iron Manganese Mixed Oxide at High Temperature," P. Franke and R. Dieckmann, J. Phys. Chem. Solids, 51(1), 49-57 (1990) and is depicted herein in FIG. 1. The depicted phase diagram is for the Fe-Mn-O system at 1000° C. and 1 atmosphere hydrostatic pressure and the y-axis is log a where a is the partial pressure of oxygen divided by P° where P° is 1 bar and the x-axis is the Fe/(Fe+Mn) fraction. With reference to FIG. 1 at Fe/(Fe+Mn) ratio of 0.6 for the conditions of the phase diagram, the hexagonal phase $(Fe_{1-x}Mn_x)_2O_3$ and the spinel phase $(Fe_{1-x}Mn_x)_3O_4$ coexist from above log a=0 to log a=−1; the spinel phase is thermodynamically stable between log a=−1 and log a=−9.3; spinel and rock salt structure $(Fe_{1-x}Mn_x)O$ phases coexist between log a=−9.3 and log a=−12.0; and the rock salt structure phase (with variable oxygen content) is present between log a=−12.0 and log a=−15.1; and if the oxygen partial pressure is decreased slightly below that corresponding to log a=−15.1; reduction occurs and a metallic alloy of almost pure iron is formed which coexists with the rock salt structure mixed oxide phase with decreased Fe/(Fe+Mn) ratio.

Turning now to Ni-Cr-O system, $NiCr_2O_4$ starting material is appropriately used and is treated preferably at 800° to 1200° C. at an oxygen partial pressure below $10^{-13}$ atmospheres for a time period, for example, ranging from 2 to 12 hours for a treated shape and up to 1 or 2 or more hours for treated particles, to produce a product containing unreduced $NiCr_2O_4$ and Ni-rich metallic alloy grains embedded in grains of $Cr_2O_3$. An appropriate phase diagram is found in Phase Diagrams for Ceramists published by American Ceramics Society, vol. 6, 1987, pp. 14-15.

Useful phase diagrams for other A (most noble metallic component)—B (least noble metallic component)—O systems can be determined from experimental results utilizing routine methods or may be found in the text books and journal articles, e.g., Phase Diagrams for Ceramists published by American Chemical society and Bulletin of Alloy Phase Diagrams.

The invention is illustrated in the following specific examples.

EXAMPLE I

Powders of $Fe_2O_3$ and $Mn_3O_4$ (particle size of 20 to 40 μm) are mixed together in amounts to produce an admixture with a Fe/(Fe+Mn) fraction of 0.6. The resulting admixture is cold pressed using uniaxially applied pressure of 141 MPa to form a cylindrical shape with a length of 2.0 to 2.5 cm and 0.8 to 0.9 cm diameter, and reacted at 1000° C. for 48 hours under an atmosphere of argon (a partial pressure of oxygen of $10^{-13}$ atmospheres) in a controlled atmosphere furnace to produce ceramic with a rock salt structure, i e., a $(Fe_{0.6}Mn_{0.4})O$ solid solution. The resultant product is ground in a ball mill to a particle size of 50 μm, and on the order of 5 grams of it are wrapped in Pt foil and then compacted by hot pressing using a uniaxial pressure of 4 MPa and 1000° C. to produce a cylindrical shape with length of 1.0–1.5 cm and diameter of 0.8 cm.

The resulting shape is maintained for 4 hours at 800° C. in an atmosphere of 5% $CO/N_2$ containing approximately 0.0001% oxygen (oxygen partial pressure of approximately $10^{-21}$ atmospheres) in a controlled atmosphere furnace. The resulting microstructure is depicted in FIG. 2 and consists of 50 micrometer diameter grains with a 400 nm thick metallic layer in the grain boundaries. (In FIG. 2, metallic phase is white, ceramic phase is gray and pores are black.) Fracture toughness testing by the method described in Journal of American Ceramic Society 63, 574-81 (1980) and the Journal of American Ceramic Society 64, 533-38 (1981) indicates a fracture toughness of 1.46 MPa-m$^{\frac{1}{2}}$ compared to a fracture toughness of 0.89 MPa-m$^{\frac{1}{2}}$ for the initial ceramic solid indicating an increase in fracture toughness of at least 60%.

EXAMPLE II

A $(Fe_{0.6}Mn_{0.4})O$ solid solution shape is formed as in Example I. Reduction is carried out for 6 hours at 800° C. and an oxygen partial pressure of approximately $10^{-21}$ atmospheres (using the same gaseous atmosphere as in Example I.) The resulting microstructure is depicted in FIG. 3 and is that of a metal matrix-ceramic oxide particulate composite containing ceramic particles separated by metallic phase of average thickness of about 4 μm. (In FIG. 3, metallic phase is white, ceramic phase is gray and pores are black.) Determination of fracture toughness as in Example I demonstrates that it is increased by more than a factor of two compared to the initial ceramic solid.

EXAMPLE III

A shape of $(Fe_{0.6}Mn_{0.4})O$ solid solution is prepared as in Example I. Reduction is carried out as in Example I except that conditions used are 2 hours at 900° C. under the same atmosphere as in Example I (oxygen partial pressure of approximately $10^{-20}$ atmospheres). The resulting microstructure is depicted in FIG. 4 and is that of a ductile phase toughened ceramic as described hereinbefore. (In FIG. 4 metallic phase is white, ceramic phase is gray and pores are black.) Determination of fracture toughness as in Example I demonstrates that it is increased by at least 75% over the initial ceramic solid.

EXAMPLE IV

Spinel $NiCr_2O_4$ is hot pressed into a cylindrical shape having 2.5 cm length and 0.8 cm diameter. The resulting shape is subjected to a temperature of 1000° C. for about 4 hours under a $CO/CO_2$ gas mixture containing more than 30 volume % CO with the remainder being $CO_2$ (corresponding to an oxygen partial pressure below $10^{-13}$ atmospheres) to cause formation of two phases by reduction of $NiCr_2O_4$. The resulting microstructure contains unreduced $NiCr_2O_4$ and Ni-rich metallic alloy grains embedded in grains of $Cr_2O_3$.

EXAMPLE V

An experiment is carried out the same as in Example IV except that the $NiCr_2O_4$ particles are not compacted but are heated in a fluidized bed with $CO/CO_2$ corresponding to an oxygen partial pressure below $10^{-13}$ atmospheres at 1000° C. for about 10 minutes. The resulting particles have a core which is unchanged covered with grains of $Cr_2O_3$ in which are embedded Ni-rich metallic alloy grains inclusions. Compaction is carried out on the resulting product by hot pressing under vacuum.

In the above Examples I-V, less than 30% of the most noble metallic component is reduced and the product contains at least 75% by weight ceramic phase.

When in Examples I-III, the starting material is $(Fe_{0.7}Mn_{0.3})O$ solid solution, there is a large increase in the amount of the Fe-rich metallic phase for the same conditions otherwise.

Variations will be obvious to those skilled in the art. For example, the starting material can contain more than two metallic components thus, the scope of the invention is defined by the claims.

What is claimed is:

1. A method for the in situ formation of a product comprising ceramic oxide grains containing metal particles or separated by a metallic layer of 0.1 to 20 microns thickness, from a starting oxide phase, comprising the step of subjecting particles or a shaped article consisting of a single starting oxide phase, containing a most noble metallic component and a least noble metallic component, to a temperature and an oxygen partial pressure and for a time period to cause reduction of only part of the most noble metallic component to elemental metal, the most noble metallic component being reducible to elemental metal at an oxygen partial pressure ranging from $10^{-30}$ atmospheres to 1 atmosphere at said temperature, the least noble metallic component being reducible from its lowest oxide to elemental metal at said temperature at an oxygen partial pressure at least three orders of magnitude less than the oxygen partial pressure where the most noble metallic component is reducible from its lowest oxide to elemental metal, the temperature being selected from the range of that exceeding 0.4 of the melting temperature in degrees Celsius of the lowest melting phase involved to that which is less than the melting temperature of any of the oxide phases involved, the oxygen partial pressure being selected from the range of greater than the equilibrium partial pressure at which the least noble metallic component of the starting oxide phase coexists with its lowest oxide to less than the equilibrium partial pressure at which the most noble metallic component of the starting oxide phase coexists with its lowest oxide, the time period being selected from the range of 3 seconds to about 24 hours, thereby to form said product.

2. The method of claim 1 wherein the most noble metallic component is selected from the group consisting of titanium, vanadium, chromium, manganese, iron, cobalt, nickel, copper and zinc and said product contains at least 50% by weight ceramic oxide.

3. The method of claim 2 wherein said product contains at least 75% by weight ceramic oxide.

4. The method of claim 3 wherein the portion of the most noble metallic component reduced ranges from 5% to 95%.

5. The method of claim i wherein the portion of the most noble metallic component reduced ranges from 5% to 95%.

6. The method of claim 5 wherein the starting oxide phase is a solid solution of iron manganese oxide, and said temperature ranges from 700° C. to 1000° C., said time period ranges from 1 hour to 10 hours, and said oxygen partial pressure ranges from $10^{-20}$ to $10^{-25}$ atmospheres.

7. The method of claim 1 wherein the most noble metallic component is selected from the group consisting of titanium, vanadium, manganese, iron, cobalt, nickel, copper and zinc and said product contains at least 50% by weight ceramic oxide.

8. The method of claim 7 wherein said product contains at least 75% by weight ceramic oxide.

9. The method of claim 1 wherein said product consists of ceramic grains separated by a metallic layer of 0.1 to 20.0 microns thickness.

10. The method of claim 9 wherein said product consists of ceramic grains separated by grain boundaries with said metallic layer having a thickness of 100 to 800 nm and being in the grain boundaries.

11. The method of claim 9 wherein said product is a metal matrix-ceramic oxide particulate composite containing ceramic particles separated by said metallic layer having an average thickness ranging from about 2 $\mu$m to about 6 $\mu$m.

* * * * *

UNITED STATES PATENT AND TRADEMARK OFFICE
CERTIFICATE OF CORRECTION

PATENT NO. : 5,240,495

DATED : August 31, 1993

INVENTOR(S) : Rudiger Dieckmann et al

It is certified that error appears in the above-identified patent and that said Letters Patent is hereby corrected as shown below:

Claim 5 (column 8, line 8), change "claim i" to -- claim 1 --.

Signed and Sealed this

Eighth Day of March, 1994

BRUCE LEHMAN

*Attest:*

*Attesting Officer*      *Commissioner of Patents and Trademarks*